United States Patent [19]

Takayama et al.

[11] Patent Number: 5,331,041
[45] Date of Patent: Jul. 19, 1994

[54] POLYMERIZABLE COMPOSITIONS AND IN-MOLD CURED PRODUCTS USING SAME

[75] Inventors: Yuji Takayama, Kanagawa; Hirokazu Matsueda, Aichi; Masato Sugiura, Aichi; Tatsuhiko Ozaki, Aichi; Hirotaka Wada, Aichi; Toshiharu Suzuki, Aichi, all of Japan

[73] Assignee: Takemoto Yushi Kabushiki Kaisha, Aichi, Japan

[21] Appl. No.: 52,634

[22] Filed: Apr. 22, 1993

[30] Foreign Application Priority Data

May 1, 1992 [JP] Japan .................. 4-139987
Mar. 9, 1993 [JP] Japan .................. 5-76232

[51] Int. Cl.$^5$ .................. C08J 3/02; C08K 3/00; C08L 51/00; C08L 39/00
[52] U.S. Cl. .................. 524/555; 524/539; 525/28; 525/455; 525/920
[58] Field of Search .................. 525/455, 920, 28, 455; 524/555, 539

[56] References Cited

U.S. PATENT DOCUMENTS 4,477,405 10/1984 Makhlouf et al. .................. 264/255

Primary Examiner—Paul R. Michl
Assistant Examiner—Patrick Niland
Attorney, Agent, or Firm—Heller, Ehrman, White & McAuliffe

[57] ABSTRACT

A polymerizable composition contains unsaturated urethane shown by Formula (1) given below, vinyl monomer which is copolymerizable with this unsaturated urethane, and an inorganic powder filler at weight ratio of (unsaturated urethane)/(vinyl monomer)=10/90–90/10, the inorganic powder filler being 30–300 weight parts with respect to 100 weight parts of the sum of the unsaturated urethane and vinyl monomer:

$$(CH_2=\overset{R^1}{\underset{|}{C}}-\overset{O}{\underset{\|}{C}}O-Z-\overset{O}{\underset{\|}{C}}-NH-X-NH-\overset{O}{\underset{\|}{C}}O)_n-Y \qquad \text{Formula (1)}$$

where $R^1$ is hydrogen atom or methyl group; X is a residual group obtained by removing isocyanate groups from diisocyanate; Y is a residual group obtained by removing hydroxyl groups from non-radical polymerizable di-ol or tri-ol of a specified kind; Z is an organic group in the form of $(R^2O)_m$ or $R^3O$, $R^2$ being an alkylene group with 2–4 carbon atoms, $R^3$ being an alkylene group with 2–12 carbon atoms, and m being an integer 2–10; and n is 2 or 3.

18 Claims, No Drawings

POLYMERIZABLE COMPOSITIONS AND IN-MOLD CURED PRODUCTS USING SAME

BACKGROUND OF THE INVENTION

This invention relates to polymerizable compositions and in-mold cured products obtained from such compositions (hereinafter referred to simply as "molded products").

Polymerizable compositions containing polymerizable liquid resins are widely in use. For example, molded products of polymerizable compositions containing unsaturated polyester resin, which is a representative example of polymerizable liquid resin, are being used as external panels and accessaries of automobiles. There are a number of molding methods available for obtaining molded products of polymerizable compositions, including the compression molding which uses sheet molding compound (SMC), the injection molding which uses bulk molding compound (BMC), the hand lay-up method whereby polymerizable compositions impregnate a reinforcing fiber mat, textile or strands and are hardened, the pultrusion method, and the resin transfer molding (RTM) and reaction injection molding (RIM) methods whereby a polymerizable composition is introduced into a mold for quick in-mold curing.

As examples of prior art polymerizable compositions containing unsaturated urethane, Japanese Patent Publication Tokkai 57-182312 and Japanese Patent Publication Tokkai 61-225210 have disclosed compositions containing polymerizable liquid resins comprising unsaturated urethane and alkyl (meth)acrylate obtained from polyisocyanate and hydroxyl alkyl (meth)acrylate.

The aforementioned prior art polymerizable compositions, however, have the following disadvantages because of their use of unsaturated urethane obtained from polyisocyanate and hydroxy alkyl (meth)acrylate:

(1) Since unsaturated urethane thus obtained contains many urethane bonds within its molecule, it is inferior in water resistance, like most other kinds of polyurethane liquid resin, as compared to other thermosetting polymerizable compositions. This limits the use of the molded products obtained by in-mold curing; and (2) Since the density of cross-links is high in such molded products obtained by in-mold curing, shrinkage in hardening is large compared to unsaturated polyester liquid resins. As a result, generation of cracks and appearance of fiber patterns are prominently observed. Low shrinkage agents may be used for preventing such phenomena but they are not very effective.

SUMMARY OF THE INVENTION

The basic object of the present invention is to eliminate the disadvantages (1) and (2) given above related to prior art polymerizable compositions containing unsaturated urethane.

In view of the above and other objects, the present inventors have conducted research on polymerizable compositions comprising unsaturated urethane, vinyl monomer which can be copolymerized therewith and inorganic fillers in a powder form. As a result of such research on the relationship between the chemical structure of unsaturated urethane and the characteristics of molded products which are obtained, it has been discovered that it is preferable to use, at a specified ratio, unsaturated urethane having introduced thereinto specified amounts of radical polymerizable groups comprising (meth)acryloyl groups and hydrophobic groups including higher hydrocarbon residual groups.

DETAILED DESCRIPTION OF THE INVENTION

This invention relates to polymerizable compositions comprising unsaturated urethane shown by Formula (1) given below, vinyl monomer which is copolymerizable with this unsaturated urethane, and an inorganic powder filler at the weight ratio of (unsaturated urethane)/(vinyl monomer)=10/90-90/10, the inorganic powder filler being 30-300 weight parts with respect to 100 weight parts of the sum of the unsaturated urethane and vinyl monomer. This invention also relates to molded products obtained by using such compositions:

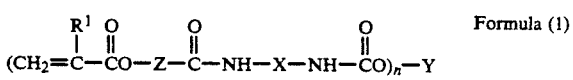

Formula (1)

where $R^1$ is hydrogen atom or methyl group; X is a residual group obtained by removing isocyanate groups from diisocyanate; Y is a residual group obtained by removing hydroxyl groups from non-radical polymerizable di-ol or tri-ol having alkyl group or alkenyl group with 5–22 carbon atoms; Z is an organic group in the form of $(R^2O)_m$ or $R^3O$, $R^2$ being an alkylene group with 2–4 carbon atoms, $R^3$ being an alkylene group with 2–12 carbon atoms, and m being an integer 2–10; and n is 2 or 3.

The unsaturated urethane shown by Formula (1) for polymerizable compositions of the present invention is a urethane compound obtained by reacting unsaturated urethane monoisocyanate (A) obtained by reacting (meth)acryl ester mono-ol to be described below and diisocyanate at molar ratio of 1/1 and non-radical polymerizable di-ol or tri-ol selected from the group consisting of (a) partial esters derivable from alkane monocarboxylic acid or alkene monocarboxylic acid with 5–22 carbon atoms and trihydric or tetrahydric poly-ol, (b) partially etherified trihydric or tetrahydric poly-ols with alkyl or alkenyl group with 5–22 carbon atoms, (c) 1,2-alkane di-ols with 6–22 carbon atoms or polyoxyalkylene alkane di-ols obtainable by addition of alkylene oxide with 2–4 carbon to 1,2-alkane di-ol with 6–22 carbon atoms, (d) partial or complete esters obtainable from hydroxy alkane monocarboxylic acid or hydroxy alkene monocarboxylic acid with 5–22 carbon atoms and dihydric or trihydric alcohol and (e) esters obtainable from 1 mole of alkyl or alkenyl succinic acid with alkyl or alkenyl group with 5–22 carbon atoms and 2 moles of (polyoxy)alkylene glycol with alkylene group with 2–4 carbon atoms (hereinafter referred to simply as non-radical polymerizable di-ol or tri-ol) (B).

Aforementioned (meth)acryl ester mono-ols to be used for the synthesis of unsaturated urethane monoisocyanate (A) include monoesters having one free hydroxyl group and derivable from (meth)acrylic acid and polyalkylene glycol having alkylene group with 2–4 carbon atoms, as well as monoesters having one free hydroxyl group and derivable from (meth)acrylic acid and alkane di-ol with 2–12 carbon atoms.

Examples of such (meth)acryl ester mono-ol include (1) mono(meth)acrylates of alkane di-ol such as 2-hydroxyethyl acrylate, 2-hydroxyethyl methacrylate, 2-hydroxypropyl methacrylate, 4-hydroxybutyl methacrylate, 6-hydroxyhexyl methacrylate and 12-hydroxydodecyl acrylate; and (2) mono(meth)acrylates of polyalkylene glycol such as diethylene glycol monomethacrylate, triethylene glycol monoacrylate, polyethylene glycol monomethacrylate, polypropylene glycol monomethacrylate, and poly-1,4-butylene glycol monoacrylate. Among the polyalkylene glycols to be used for deriving these (meth)acryl ester mono-ols, those with molecular weight 200 or less can be used advantageously, but those with molecular weight 80 or less are even more preferred.

Examples of diisocyanate to be used for the synthesis of unsaturated urethane monoisocyanate (A) include (1) aromatic diisocyanates such as many kinds of tolylene diisocyanate, diphenylmethane diisocyanate, diphenylether-4,4'-diisocyanate, and toluidine diisocyanate; (2) aralkyl diisocyanates such as xylylene diisocyanate; and (3) aliphatic diisocyanates such as hexamethylene diisocyanate and trimethyl hexamethylene diisocyanate.

Examples of unsaturated urethane monoisocyanate (A), obtainable by reacting such (meth)acryl ester mono-ol as described above with diisocyanate, include reaction product of hydroxyethyl (meth)acrylate and tolylene diisocyanate at molar ratio of 1/1, reaction product of hydroxypropyl (meth)acrylate and hexamethylene diisocyanate at molar ratio of 1/1, reaction product of diethylene glycol mono(meth)acrylate and tolylene diisocyanate at molar ratio of 1/1, reaction product of polypropylene glycol mono(meth)acrylate and diphenylmethane diisocyanate at molar ratio of 1/1, and reaction product of 4-hydroxybutyl (meth)acrylate and xylylene diisocyanate at molar ratio of 1 / 1.

Examples of non-radical polymerizable di-ol or tri-ol (B) to be reacted with unsaturated urethane monoisocyanate (A) include (a) ester di-ols and ester tri-ols which are a partial ester derivable from alkane monocarboxylic acid or alkene monocarboxylic acid with 5-22 carbon atoms and trihydric or tetrahydric poly-ol; (b) ether di-ols and ether tri-ols which are partially etherified trihydric or tetrahydric poly-ol; (b) ether di-ols and ether tri-ols which are partially etherified trihydric or tetrahydric poly-ol with alkyl group or alkenyl group with 5-22 carbon atoms; (c) 1,2-alkane di-ol with 6-22 carbon atoms or polyoxyalkylene alkane di-ols obtainable by addition of alkylene oxide with 2-4 carbon atoms to such alkane di-ol; (d) ester di-ols and ester tri-ols which are a partial or complete ester obtainable from hydroxyalkane monocarboxylic acid with 5-22 carbon atoms or hydroxyalkene monocarboxylic acid and dihydric or trihydric alcohol; and (e) ester obtainable from 1 mole of alkyl or alenyl succinic acid with alkyl or alkenyl group with 5-22 carbon atoms and 2 moles of (polyoxy)alkylene glycol with alkylene group with 2-4 carbon atoms.

Examples of ester di-ol in (a) above include (1) monoesters of trihydric poly-ol obtainable from 1 mole of trihydric poly-ol and 1 mole of monocarboxylic acid such as glycerine monoisooctanoate, glycerine monooleate, trimethylol propane monooctanoate, trimethylol ethane monoisonanoate, and (poly) ethoxylated glycerine monooctanoate; and (2) di-esters of tetrahydric poly-ol obtainable from 1 mole of tetrahydric poly-ol and 2 moles of monocarboxylic acid such as pentaerythritol dihexanoate and pentaerythritol monooctanoate monodecanoate. Examples of ester tri-ol in (a) above include mono-esters of tetra-ol obtainable from 1 mole of tetra-ol and 1 mole of monocarboxylic acid such as pentaerythritol monooleate and diglycerine monooctanoate.

Examples of ether di-ol in (b) above include (1) monoalkyl glycerylether or monoalkenyl glycerylether obtainable from 1 mole of aliphatic alcohol and 1 mole of glycidol such as monooctyl glycerylether, monoisotridecyl glycerylether and monooleyl glycerylether; and (2) di-ol-di- (1-alkoxy-2-hydroxypropyl)ethers and di-ol-di-(1-alkenoxy-2-hydroxypropyl)ethers obtainable from 1 mole of diglycidylether of di-ol and 2 moles of aliphatic alcohol such as ethylene glycol-di-(1-lauroxy-2-hydroxypropyl) ether and dipropylene glycol-di-(1-oleoxy-2-hydroxypropyl) ether. Examples of ether tri-ol in (b) above include (1) monoalkyl diglycerylethers and monoalkenyl diglycerylethers obtainable from 1 mole of aliphatic alcohol and 2 moles of glycidol such as monolauryl diglycerylether and monooleyl diglycerylether; (2) tri-ol-di-(1-alkoxy-2-hydroxypropyl) ethers and tri-ol-di-( 1-alkenoxy-2-hydroxypropyl)ethers obtainable from 1 mole of diglycidylether of tri-ol and 2 moles of aliphatic alcohol such as glycerine-di-(1-octoxy-2-hydroxypropyl) ether and trimethylol propane-di-(1-oleoxy-2-hydroxypropyl) ether; and (3) tri-ol-tri-(1-alkoxy-2-hydroxypropyl)ethers and tri-ol-tri-(1-alkenoxy-2-hydroxypropyl)ethers obtainable from 1 mole of triglycidylether of tri-ol and 3 moles of aliphatic alcohol such as trimethylol propane-tri- (1-isotridecanoxy-2-hydroxypropyl) ether and glycerine-tri-(1-oleoxy-2-hydroxypropyl-ether.

Examples of 1,2-alkane di-ol in (c) above include 1,2-dihydroxydecane, 1,2-dihydroxydodecane and 1,2-dihydroxy octadecane. Examples of polyoxyalkylene alkane di-ol in (c) above include 1,2-di-(2-hydroxyethoxy) -decane and 1,2-di-(2-hydroxypropy 1 oxy)-dodecane.

Examples of ester di-ol in (d) above include ethylene glycol-mono-(12-hydroxy octadecanoate) and 1,4-butylene glycol-di-(12-hydroxy-9-octadecenoate). Examples of ester tri-ol in (d) above include glycerine-mono-( 12-hydroxy octadecanoate) and trimethylol propane-tri-(2-hydroxy tetradecanoate).

Examples of ester in (e) above include pentadecyl succinic acid-di-(2-hydroxyethyl ester) and octadecyl succinic acid-di-(2-hydroxypropyl ester).

Unsaturated urethane shown by Formula (1) is a reaction product of unsaturated urethane monoisocyanate (A) and non-radical polymerizable di-ol (B) at molar ratio of 2/1 or a reaction product of unsaturated urethane monoisocyanate (A) and non-radical polymerizable tri-ol (B) at molar ratio of 3/1. It is preferred that the reaction ratio between unsaturated urethane monoisocyanate (A) and non-radical polymerizable di-ol or tri-ol (B) be 1/1 by molar ratio of functional groups (NCO/OH), but no particular ill-effects are encountered if the ratio is varied within the range of 1/0.95–0.95/1.

Unsaturated urethane shown by Formula (1) may be synthesized by adding an inactive solvent to (meth)acryl ester mono-ol, further adding a catalyst such as tertiary amine, metallic salts or preferably di-n-butyl tin dilaurate as well known for the synthesis of polyurethane, gradually adding diisocyanate while temperature is maintained at 30° C. to synthesize unsaturated urethane monoisocyanate (A), and further adding non-radical polymerizable di-ol or non-radical polymerizable tri-ol (B). In this situation, it is preferable to use as the inactive solvent a vinyl monomer such as alkyl (meth)acrylate or styrene which are reaction dilutants because the step of removing the inactive solvent after the reaction will then be dispensed with.

There is no particular limitation as to the kind of vinyl monomer to be used as reaction dilutant for unsaturated urethane in connection with polymerizable compositions of the present invention, as long as they are copolymerizable with the unsaturated urethane. Examples of such vinyl monomer include (1) alkyl (meth)acrylates such as methyl methacrylate, methyl acrylate, ethyl methacrylate and ethyl acrylate, (2) vinyl aromatic hydrocarbons such as styrene, methyl styrene and divinyl benzene, and (3) diallyl phthalate. They may be used singly or as a mixture of two or more. From the point of view of the properties of the molded products to be obtained, however, methyl methacrylate, styrene and their mixtures are preferable.

In the polymerizable compositions according to the present invention, preferable weight ratio between the unsaturated urethane and the vinyl monomer which is copolymerizable therewith (unsaturated urethane)/(vinyl monomer) is 10/90–90/10 and, more preferably, 40/60–75/25. If this ratio is smaller than 10/90, the curing speed is too low and the physical properties of the molded products obtained therefrom are poor. If it exceeds 90/10, on the other hand, viscosity becomes too high and the in-mold curing process becomes difficult.

The unsaturated urethane contained in polymerizable compositions according to the present invention has within its molecule at least two radical polymerizable double bonds and at least one higher aliphatic hydrocarbon group. The number of such double bonds contained in a molecule and the molecular weight of the unsaturated urethane per double bond affect the speed of its curing speed. In order to obtain a practically convenient curing reaction speed, the unsaturated urethane should be such that its molecular weight per such double bond be 700 or less and, more preferably, in the range of 350–650.

Polymerizable compositions according to the present invention are composed not only of aforementioned unsaturated urethane and vinyl monomer which is copolymerizable therewith (this mixture being hereinafter referred to simply as "liquid resin"), but also of an inorganic powder filler. The content of the inorganic powder filler is 30–300 weight parts to 100 weight parts of the liquid resin. The amount of such inorganic powder filler to be contained varies according to its kind, particle size, the molding method of the polymerizable composition and the desired properties of the molded products to be obtained. In general, however, the preferred ratio is 100–300 weight parts to 100 weight parts of the liquid resin.

Examples of such inorganic powder filler include alumina trihydrate ($Al_2O_3 \cdot 3H_2O$), calcium carbonate, silica and calcium sulfate dihydrate ($CaSO_4 \cdot 2H_2O$). If use is made of a material containing water of crystallization, or alumina trihydrate in particular, flame-retarding property can be provided to the molded products obtained by in-mold curing.

Molded products according to the present invention are obtained by in-mold curing of polymerizable compositions described above. Various problems associated with water-resistance and shrinkage in hardening are reduced with the molded products according to the present invention. In order to improve these physical properties of molded products, higher aliphatic hydrocarbon groups with 5–22 carbon atoms are introduced according to the present invention into the molecules of unsaturated urethane. Preferable examples of such higher aliphatic hydrocarbon group include alkyl groups and isoalkyl groups with 6–18 carbon atoms. Moreover, it is preferred that the ratio of the number of higher aliphatic hydrocarbon groups to be introduced with respect to that of (meth)acryl groups in the unsaturated urethane molecule be 1/3–1 and that its content be 10–40 weight %.

Various methods known for preparing polymerizable compositions containing unsaturated polyester resins can be used for the preparation of polymerizable compositions of the present invention. Similarly, various methods known for in-mold curing of polymerizable compositions containing unsaturated polyester resins can be used for the present invention. For example, curing agents and curing accelerators of many kinds can be used for radical polymerization.

Examples of curing agent include benzoyl peroxide, t-butyl peroxy-2-ethyl hexanoate, t-butyl peroxy benzoate, 1,1-di-t-butyl peroxy-3,3,5-trimethyl cyclohexane, and bis(4-t-butyl cyclohexyl) peroxy dicarbonate. They may be used singly or as a mixture of two or more. Examples of curing accelerator include tertiary amines such as N,N-dimethyl-p-toluidine and N,N-dimethyl aniline. The curing agent is normally used at the rate of 1–5 weight % with respect to the whole of the polymerizable composition of the invention. A mold releasing agent may also be used in the case of in-mold curing. Examples of such mold releasing agent include metallic soap of, say, zinc stearate, and Zelec UN (which is a trade name for phosphoric ester produced by E. I. du pont de Nemours and Co.)

Molded products according to the present invention can be easily obtained from polymerizable compositions of the invention by any of the in-mold curing methods such as the pultrusion method, the injection molding by the use of BMC, the compression molding by using SMC, the resin transfer molding, and the reaction injection molding. At the time of in-mold curing, reinforcing fibers may be caused to be contained so as to add strength to the molded product. Methods of strengthening molded products include preliminarily setting reinforcing fibers inside the mold in the form of a mat, textile or strands and bringing a polymerizable composition and a curing agent thereinto, or preliminarily impregnating reinforcing strands with a polymerizable composition with a curing agent added thereto and using them in in-mold curing. Examples of reinforcing fibers include glass fibers, carbon fibers and aramid fibers.

For the purpose of obtaining molded products with even more reduced shrinkage in hardening, it is preferred to increase the contents of inorganic powder filler and reinforcing fibers as much as possible. It is preferred that the content of inorganic powder filler be 100–300 weight parts to 100 weight parts of liquid resins, and more preferably 150–300 weight parts such that the volume ratio of the reinforcing fibers inside the molded product is over 30 volume %, and more preferably 40–70 volume %. In order to obtain molded products with such high contents of inorganic powder filler and reinforcing fibers, it is most advantageous to make use of a pultrusion method. A high level of flame retarding property can be provided to the molded products by pultrusion if alumina trihydrate is used as inorganic powder filler and non-organic fibers such as glass fibers, carbon fibers or steel fibers are used as reinforcing fibers.

The present invention will be described next by way of examples such that its characteristics and effects can be more clearly understood, but the present invention is not intended to be limited by these examples. In what follows, weight parts will be simply referred to as parts, and weight % will be simply referred to as % except regarding glass content and oxygen index.

TESTS AND RESULTS

Test Series 1

Synthesis of Unsaturated Urethane I-1 and Preparation of Liquid Resin i-1

After methyl methacrylate 305 parts, diethylene glycol monomethacrylate 174 parts (1.0 mole) and di-n-butyl tin dilaurate 1 part were taken inside a reaction vessel and stirred while temperature was kept at 50° C., Kolonate T-80 (trade name of Nippon Polyurethane Industry, Co., Ltd. for 2,4- and 2,6-mixed tolylene diisocyanate) 174 parts (1.0 mole) was dropped in over a period of 30 minutes. Although reaction heat was generated at this moment, the reaction temperature was kept at 60° C. or below. The reaction was completed thereafter by keeping it for 1 hour at 60° C. What was obtained was a methyl methacrylate solution of unsaturated urethane monoisocyanate which is a reaction product of diethylene glycol monomethacrylate and tolylene diisocyanate at molar ratio of 1/1. Glycerine monoisooctanoate 109 parts (0.5 moles) was dropped into this reaction product over a period of 30 minutes at 50° C. Although reaction heat was generated at this moment, the reaction temperature was kept at 60° C. or below. The synthesis was completed thereafter by keeping it for 1 hour at 60° C. to obtain Liquid Resin i-1 containing 60% of Unsaturated Urethane I-1.

Synthesis of Unsaturated Urethane I-2 and Preparation of Liquid Resin i-2

After oleyl alcohol 268 parts (1.0 mole) and boron trifluoride ether complex 1.5 parts were taken inside a reaction vessel and stirred while temperature was held at 80° C. propylene glycol diglycidyl ether 94 parts (0.5 moles) was dropped in over a period of 30 minutes. During this dripping process, the reaction temperature was maintained at 80°-90° C. The reaction was completed thereafter by keeping it for 1 hour at 100° C. Oxylan oxygen inside the reaction product was analyzed but it had almost completely disappeared. What was obtained was propylene glycol-di-(1-oleoxy-2-hydroxypropyl)ether and it was used for the synthesis of Unsaturated Urethane I-2 as described below.

Methyl methacrylate 447 parts, hydroxyethyl acrylate 116 parts (1.0 mole), di-n-butyl tin dilaurate 1 part and Kolonate T-80 (trade name of Nippon Polyurethane Industry, Co., Ltd. for 2,4- and 2,6-mixed tolylene diisocyanate) 174 parts (1.0 mole) were used to obtain, as in the case of Unsaturated Urethane I-1 described above, a methyl methacrylate solution of unsaturated urethane monoisocyanate which is a reaction product of hydroxyethyl acrylate and tolylene diisocyanate at molar ratio of 1/1. Aforementioned propylene glycol-di-(1-oleoxy-2-hydroxypropyl)ether 380 parts (0.5 moles) was used therewith to obtain Liquid Resin i-2 containing 60% of Unsaturated Urethane I-2, further as in the case of Unsaturated Urethane I-1 described above.

Synthesis of Unsaturated Urethane I-3 and Preparation of Liquid Resin i-3

Octyl alcohol 260 parts (2.0 moles), boron trifluoride ether complex 1.5 parts and glycerine diglycidylether 203 parts (1.0 mole) were used to obtain, as in the case of Unsaturated Urethane I-2 described above, glycerine-di- ( 1-octoxy-2-hydroxypropyl)ether. This was used for the synthesis of Unsaturated Urethane I-3 as described below.

Styrene 356 parts, hydroxyethyl methacrylate 130 parts (1.0 mole), di-n-butyl tin dilaurate 1 part and diphenylmethane diisocyanate 250 parts (1.0 mole) were used to obtain, as in the case of Unsaturated Urethane I-1 described above, a styrene solution of unsaturated urethane monoisocyanate which is a reaction product of hydroxyethyl methacrylate and diphenylmethane diisocyanate at molar ratio of 1/1. Aforementioned glycerine-di- ( 1-octoxy-2-hydroxypropyl ) ether 154.7 parts (0.33 moles) was used with it to obtain Liquid Resin i-3 containing 60% of Unsaturated Urethane I-3, further as in the case of Unsaturated Urethane I-1.

Synthesis of Unsaturated Urethane I-4 and Preparation of Liquid Resin i-4

Methyl methacrylate 266 parts, hydroxyethyl methacrylate 130 parts (1,0 mole), di-n-butyl tin dilaurate 1 part and hexamethylene diisocyanate 168 parts (1.0 mole) were used to obtain, as in the case of Unsaturated Urethane I-1, a methyl methacrylate solution of unsaturated urethane monoisocyanate which is a reaction product of hydroxyethyl acrylate and hexamethylene diisocyanate at molar ratio of 1/1. To this was added 1,2-dihydroxy dodecane 101 parts (0.5 moles) to obtain Liquid Resin i-4 containing 60% of Unsaturated Urethane I-4, further as in the case of Unsaturated Urethane I-1.

Synthesis of Unsaturated Urethane I-5 and Preparation of Liquid Resin i-5

Methyl methacrylate 341 parts, 2-hydroxypropyl methacrylate 144 parts (1.0 mole), di-n-butyl tin dilaurate 1 part and hexamethylene diisocyanate 168 parts (1.0 mole) were used to obtain, as in the case of Unsaturated Urethane I-1, a methyl methacrylate solution of unsaturated urethane monoisocyanate which is a reaction product of 2-hydroxypropyl acrylate and hexamethylene diisocyanate at molar ratio of 1/1. To this was added trimethylol propane monooleate 199 parts (0.5 moles) to obtain Liquid Resin i-5 containing 60% of Unsaturated Urethane I-5, further as in the case of Unsaturated Urethane I-1.

Synthesis of Unsaturated Urethane I-6 and Preparation of Liquid Resin i-6

Lauryl alcohol 186 parts (1.0 mole), boron trifluoride ether complex 1.0 part and glycidol 78 parts (1.05 moles) were used to obtain monolauryl glyceryl ether as in the case of Unsaturated Urethane I-2. This was used in the synthesis of Unsaturated Urethane I-6 as shown below.

Styrene 317 parts, 4-hydroxybutyl methacrylate 158 parts (1.0 mole), di-n-butyl tin dilaurate 1 part and xylylene diisocyanate 188 parts (1.0 mole) were used to obtain, as in the case of Unsaturated Urethane I-1, a styrene solution of unsaturated urethane monoisocyanate which is a reaction product of 4-hydroxybutyl methacrylate and xylylene diisocyanate at molar ratio of 1/1. To this was added aforementioned monolauryl glyceryl ether 130 parts (0.5 moles) to obtain Liquid Resin i-6 containing 60% of Unsaturated Urethane I-6, further as in the case of Unsaturated Urethane I-1.

Synthesis of Unsaturated Urethane I-7 and Preparation of Liquid Resin i-7

Methyl methacrylate 400 parts, hydroxyethyl acrylate 116 parts (1.0 mole), di-n-butyl tin dilaurate 1 part and Kolonate T-80 (trade name of Nippon Polyurethane Industry, Co., Ltd. for 2,4- and 2,6-mixed tolylene diisocyanate) 174 parts (1.0 mole) were used to obtain, as in the case of Unsaturated Urethane I-1, a methyl methacrylate solution of unsaturated urethane monoisocyanate which is a reaction product of hydroxyethyl acrylate and tolylene diisocyanate at molar ratio of 1/1. To this was added glycerine-tri-(12-hydroxy-9-octadecenoate) 311 parts (0.33 moles) to obtain Liquid Resin i-7 containing 60% of Unsaturated Urethane I-7, further as in the case of Unsaturated Urethane I-1.

Synthesis of Unsaturated Urethane I-8 and Preparation of Liquid Resin i-8

Methyl methacrylate 327 parts, hydroxyethyl methacrylate 130 parts (1.0 mole), di-n-butyl tin dilaurate 1 part and Kolonate T-80 (trade name of Nippon Polyurethane Industry, Co., Ltd. for 2,4- and 2,6-mixed tolylene diisocyanate) 174 parts (1.0 mole) were used to obtain, as in the case of Unsaturated Urethane I-1, a methyl methacrylate solution of unsaturated urethane monoisocyanate which is a reaction product of hydroxyethyl methacrylate and tolylene diisocyanate at molar ratio of 1/1. To this was used dodecyl succinic acid-di-(2-hydroxyethyl)ester 186 parts (0.5 moles) to obtain Liquid Resin i-8 containing 60% of Unsaturated Urethane I-8, further as in the case of Unsaturated Urethane I-1.

Synthesis of Unsaturated Urethane R-1 and Preparation of Liquid Resin r-1

2-hydroxyethyl methacrylate 91 parts (0.7 moles), methyl methacrylate 120 parts, di-n-butyl tin dilaurate 1 part and Millionate MR-100 (trade name of Nippon Polyurethane Industry, Co., Ltd. for polymethyl polyphenyl polyisocyanate with average number of NCO = 3.5) 89 parts (0.2 mole) were used to obtain Liquid Resin r-1 containing 60% of Unsaturated Urethane R-1 as in the case of Unsaturated Urethane I-1.

Synthesis of Unsaturated Urethane R-2 and Preparation of Liquid Resin r-2

2-hydroxyethyl methacrylate 130 parts (1.0 mole), styrene 145 parts, di-n-butyl tin dilaurate 1 part and Kolonate T-80 (trade name of Nippon Polyurethane Industry, Co., Ltd. for 2,4- and 2,6-mixed tolylene diisocyanate) 87 parts (0.5 moles) were used to obtain Liquid Resin r-2 containing 60% of Unsaturated Urethane R-2 as in the case of Unsaturated Urethane I-1.

Descriptions of unsaturated urethane samples thus obtained are given in Table 1.

TABLE 1

| Type of unsaturated urethane | Molecular weight (x) | Number of double bonds (y) | x/y | Weight % of higher alkyl groups |
| --- | --- | --- | --- | --- |
| I-1 | 914 | 2 | 457 | 11 |
| I-2 | 1340 | 2 | 670 | 37 |
| I-3 | 1604 | 3 | 535 | 14 |
| I-4 | 798 | 2 | 399 | 18 |
| I-5 | 1022 | 2 | 511 | 23 |
| I-6 | 952 | 2 | 476 | 18 |
| I-7 | 1802 | 3 | 601 | 41 |
| I-8 | 928 | 2 | 491 | 17 |
| R-1 | 902 | 3.5 | 258 | 0 |
| R-2 | 434 | 2 | 217 | 0 |

Test Series 2

(Preparation of Polymerizable Composition, Production of Molded Products by Resin Transfer Molding (RTM), and Evaluation Thereof)

Test Examples 1–8 and Comparison Examples 1–4

Polymerizable compositions were prepared by adding alumina trihydrate to the liquid resins obtained in Test Series 1 at the rates shown in Table 2, and mixtures were produced by adding an additive comprising a hardening accelerator, a mold releasing agent and a low shrinkage agent as shown also in Table 2. On the other hand, a glass strand continuous mat (Unifilo U-750, trade name of Nippon Electric Glass Co., Ltd.) was set in a nickel metallized mold heated to 35° C. such that the glass content would be 25% and the mold was tightened to 2.5 kg/cm². Thereafter, specified amounts of the aforementioned mixtures and radical initiator solutions were injected at the rates shown in Table 2 into the mold by using measuring pumps through a static mixer to form uniform mixtures. The injection was stopped at the point in time when the injected liquid began to flow out from a clearance opposite from the injection opening. The product was taken out of the mold 20 minutes after the injection was stopped.

For each molded product thus obtained, fiber patterns and occurrence of cracks were visually examined. The results are also shown in Table 2.

TABLE 2

| | Test Examples | | | | | | | | Comparison Examples | | | |
| --- | --- | --- | --- | --- | --- | --- | --- | --- | --- | --- | --- | --- |
| | 1 | 2 | 3 | 4 | 5 | 6 | 7 | 8 | 1 | 2 | 3 | 4 |
| {Mixture} (Polymerizable composition) | | | | | | | | | | | | |
| Liquid Resin | i-1 | i-2 | i-3 | i-4 | i-5 | i-6 | i-7 | i-8 | r-1 | r-2 | r-1 | r-2 |
| | 100 | 100 | 100 | 100 | 100 | 100 | 100 | 100 | 100 | 100 | 100 | 100 |
| Alumina trihydrate | 100 | 100 | 100 | 100 | 100 | 100 | 100 | 100 | 100 | 100 | 100 | |
| (Additives) | | | | | | | | | | | | |
| Curing accelerator | *4 | *4 | *4 | *4 | *4 | *4 | *4 | *4 | *4 | *4 | *4 | *4 |
| Mold releasing agent | 0.5 | 0.5 | 0.5 | 0.5 | 0.5 | 0.5 | 0.5 | 0.5 | 0.5 | 0.5 | 0.5 | 0.5 |
| Low shrinking agent | — | — | — | — | — | — | — | — | — | — | 40 | 40 |
| (Radical initiator) *5 | 2.0 | 2.0 | 2.0 | 2,0 | 2.0 | 2.0 | 2,0 | 2.0 | 2.0 | 2.0 | 2.0 | 2.0 |
| {Results} | | | | | | | | | | | | |
| Fiber patterns | No | No | No | No | No | No | No | No | Yes | Yes | Yes | Yes |

TABLE 2-continued

|  | Test Examples | | | | | | | | Comparison Examples | | | |
|---|---|---|---|---|---|---|---|---|---|---|---|---|
|  | 1 | 2 | 3 | 4 | 5 | 6 | 7 | 8 | 1 | 2 | 3 | 4 |
| Occurrence of cracks | No | No | No | No | No | No | No | No | Yes | Yes | Yes | Yes |

Notes:
Numbers in units of weight part;
Liquid resins: Type (upper line), weight part (lower line);
Mold releasing agent: Mold Wiz (produced by Kozakura Shokai Co., Ltd.)
Low shrinking agent for Comparison Example 3
40 parts of polyvinyl acetate (molecular weight = 200,000) dissolved in 60 parts of methyl methacrylate
Low shrinking agent for Comparison Example 4:
33.3 parts of polypropylene adipate (molecular weight = 5000) dissolved in 66.7 parts of styrene
*4: 0.075
*5: 50% solution of dibenzoyl peroxide (Nypper BMT-M produced by Nippon Oil and Fats Co., Ltd.)
Spots of phase-separated portions of low shrinking agents were observed on the surfaces of molded products from Comparison Examples 3 and 4.

Test Series 3

Preparation of Polymerizable Compositions, Production of Molded Products by Cast Molding, and Evaluation Thereof Test Examples 9-16 and Comparison Examples 5-8

Polymerizable compositions were prepared by adding alumina trihydrate to the liquid resins obtained in Test Series 1 at rates shown in Table 3 and mixtures were produced by adding an additive comprising a curing accelerator, a mold releasing agent and a low shrinkage agent. On the other hand, a polyethylene tube of outer diameter 5 mm was sandwiched between two glass sheets (25 cm × 25 cm) of thickness 5 mm to form a mold with a clearance of 3 mm. The aforementioned mixtures and radical initiator solutions were uniformly mixed together at the rates shown in Table 3 and poured into this mold. The mold was placed inside a thermostat of 35° C. for one hour and then at 80° C. for 12 hours to obtain molded products.

Test pieces of length 80 mm, width 25 mm and thickness 3 mm were prepared by using a diamond cutter to cut these molded products. After these test pieces were accurately weighed, they were immersed in warm water of 80° C. for 30 hours. After they were taken out, their external appearance was examined regarding whitening and occurrence of cracks. The weight of each test piece was compared before and after the testing to calculate the water absorbing capacity according to the formula given below. The flexural strength was also measured according to JIS-K6911 (Japanese Industrial Standards) to determine the lowering in flexural strength by the formula given bellow.

Water absorbing capacity (%) = {((Weight after testing) − (Weight before testing))/(Weight before testing)} × 100.

Lowering in flexural strength (%) = {((Strength before testing) − (Strength after testing))/(Strength before testing)} × 100.

These test results are also shown in Table 3, in which the water absorbing capacity and the lowering in flexural strength are shown by an average of n = 3 measured values.

TABLE 3

|  | Test Examples | | | | | | | | Comparison Examples | | | |
|---|---|---|---|---|---|---|---|---|---|---|---|---|
|  | 9 | 10 | 11 | 12 | 13 | 14 | 15 | 16 | 5 | 6 | 7 | 8 |
| {Mixture} (Polymerizable composition) | | | | | | | | | | | | |
| Liquid Resin | i-1 | i-2 | i-3 | i-4 | i-5 | i-6 | i-7 | i-8 | r-1 | r-2 | r-1 | r-2 |
|  | 100 | 100 | 100 | 100 | 100 | 100 | 100 | 100 | 100 | 100 | 100 | 100 |
| Alumina trihydrate | 50 | 50 | 50 | 50 | 50 | 50 | 50 | 50 | 50 | 50 | 50 | 50 |
| (Additives) | | | | | | | | | | | | |
| Curing accelerator | *4 | *4 | *4 | *4 | *4 | *4 | *4 | *4 | *4 | *4 | *4 | *4 |
| Mold releasing agent | 0.5 | 0.5 | 0.5 | 0.5 | 0.5 | 0.5 | 0.5 | 0.5 | 0.5 | 0.5 | 0.5 | 0.5 |
| Low shrinking agent | — | — | — | — | — | — | — | — | — | — | 40 | 40 |
| (Radical initiator) *5 | 2.0 | 2.0 | 2.0 | 2,0 | 2.0 | 2.0 | 2,0 | 2.0 | 2.0 | 2.0 | 2.0 | 2.0 |
| {Results} | | | | | | | | | | | | |
| Whitening or cracks | No | No | No | No | No | No | No | No | Yes | Yes | Yes | Yes |
| Water absorbing capacity (%) | 1.2 | 0.4 | 0.9 | 0.7 | 0.5 | 0.6 | 0.4 | 0.7 | 3.0 | 2.7 | 3.7 | 3.6 |
| Lowering in flexural strength (%) | 22.2 | 10.9 | 20.4 | 16.9 | 12.5 | 15.1 | 10.5 | 17.2 | 38.5 | 35.4 | 41.0 | 40.1 |

Notes:
See Notes to Table 2 regarding liquid resins, curing accelerator, mold releasing agent, *4 and *5.

Preparation of Polymerizable Compositions, Production of Molded Products by Pultrusion, and Evaluation Thereof Test Examples 17-22 and Comparison Examples 9-12

Polymerizable compositions were prepared by using the liquid resins obtained in Test Series 1 as shown in Table 4 and mixtures were produced by adding an additive comprising a radical initiator and a mold releasing agent as shown in Table 4. After these mixtures were soaked in glass roving as shown in Table 4, they were passed through a flat mold of dimensions 25 × 3 mm × 400 mm for pultrusion molding at the speed of 20 cm/minute to obtain in-mold cured products with width 25 mm and thickness 3 mm in a continuous planar form.

For each molded product thus obtained, fiber patterns and occurrence of warping were visually examined. Additionally, test pieces of length 100mm, width 6.5mm and thickness 3mm were prepared by using a diamond cutter to cut these molded products. The oxygen index method of testing flammability of polymeric materials according to JIS-K7201 (Japanese Industrial Standards) was carried out on these test pieces. The results of these tests are shown in Table 4.

As is clear from the above, the present invention can provide molded products with improved appearance and water-resistance and small mold shrinkage.

TABLE 4

| | Test Examples | | | | | | Comparison Examples | | | |
|---|---|---|---|---|---|---|---|---|---|---|
| | 17 | 18 | 19 | 20 | 21 | 22 | 9 | 10 | 11 | 12 |
| {Mixture} (Polymerizable composition) | | | | | | | | | | |
| Liquid Resin | i-1 | i-1 | i-4 | i-4 | i-6 | i-8 | i-1 | r-1 | r-1 | r-2 |
|  | 100 | 100 | 100 | 100 | 100 | 100 | 100 | 100 | 100 | 100 |
| Alumina trihydrate | 100 | 200 | 150 | 300 | 200 | 200 | 0 | 100 | 200 | 150 |
| (Additives) Radical initiator | | | | | | | | | | |
| *6 | 1 | 1 | 1 | 1 | 1 | 1 | 1 | 1 | 1 | 1 |
| *7 | 1 | 1 | 1 | 1 | 1 | 1 | 1 | 1 | 1 | 1 |
| Mold releasing agent | 1 | 1 | 1 | 1 | 1 | 1 | 1 | 1 | 1 | 1 |
| (Glass roving | | | | | | | | | | |
| Number of pieces | 30 | 30 | 20 | 20 | 25 | 25 | 30 | 30 | 25 | 25 |
| Content (volume %) | 60 | 60 | 40 | 40 | 50 | 50 | 60 | 60 | 50 | 50 |
| {Results} | | | | | | | | | | |
| Fiber patterns | No | No | No | No | No | No | Yes | Yes | Yes | Yes |
| Warping | No | No | No | No | No | No | Yes | Yes | Yes | Yes |
| Oxygen index | 70< | 70< | 70< | 70< | 70< | 70< | 30> | 70< | 70< | 70< |

Notes:
See Notes to Table 2 regarding liquid resins and mold releasing agent;
*6: Peroil TCP (trade name of Nippon Oil and Fats Co., Ltd. for bis(4-t-butyl cyclohexyl)peroxy dicarbonate);
*7: Percure HI (trade name of Nippon Oil and Fats Co., Ltd. for t-butyl peroxy benzoate); roving
Glass roving ER4400F-183 (trade name of Nippon Electric Glass Co., Ltd.);
Glass roving content: Volume % inside in-mold cured product.

What is claimed is:

1. A polymerizable composition comprising unsaturated urethane shown by Formula (1) given below, vinyl monomer copolymerizable with said unsaturated urethane, and an inorganic powder filler, said unsaturated urethane and said vinyl monomer being contained at weight ratio 10/90-90/10, said inorganic powder filler being contained at a rate of 30-300 weight parts per 100 weight parts of the sum of said unsaturated urethane and said vinyl monomer:

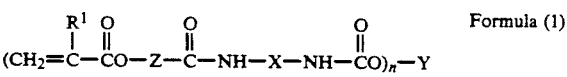

Formula (1)

where $R^1$ is hydrogen atom or methyl group; X is a residual group obtained by removing isocyanate groups from diisocyanate; Y is a residual group obtained by removing hydroxyl groups from non-radical polymerizable di-ol or tri-ol selected from the group consisting of (a) partial esters derivable from alkane monocarboxylic acid or alkene monocarboxylic acid with 5-22 carbon atoms and trihydric or tetrahydric poly-ol, (b) partially etherified trihydric or tetrahydric poly-ols with alkyl or alkenyl group with 5-22 carbon atoms, (c) 1,2-alkane di-ols with 6-22 carbon atoms or polyoxyalkylene alkane di-ols obtainable by addition of alkylene oxide with 2-4 carbon to 1,2-alkane di-ol with 6-22 carbon atoms, (d) partial or complete esters obtainable from hydroxy alkane monocarboxylic acid or hydroxy alkene monocarboxylic acid with 5-22 carbon atoms and dihydric or trihydric alcohol and (e) esters obtainable from 1 mole of alkyl or alkenyl succinic acid with alkyl or alkenyl group with 5-22 carbon atoms and 2 moles of (polyoxy)alkylene glycol with alkylene group with 2-4 carbon atoms; Z is an organic group in the form of $(R^2O)_m$ or $R^3O$, $R^2$ being an alkylene group with 2-4 carbon atoms, $R^3$ being an alkylene group with 2-12 carbon atoms, and m being an integer 2-10; and n is 2 or 2. The polymerizable composition of claim 1 containing 100-300 weight parts of said inorganic powder filler for 100 weight parts of the sum of said unsaturated urethane and said vinyl monomer.

3. The polymerizable composition of claim 2 wherein said inorganic powder filler comprises alumina trihydrate.

4. An in-mold cured product using the polymerizable composition of claim 1.

5. An in-mold cured product using the polymerizable composition of claim 2.

6. An in-mold cured product using the polymerizable composition of claim 3.

7. The in-mold cured product of claim 4 which is reinforced with reinforcing fibers.

8. The in-mold cured product of claim 5 which is reinforced with reinforcing fibers.

9. The in-mold cured product of claim 6 which is reinforced with reinforcing fibers.

10. The in-mold cured product of claim 7 containing said reinforcing fibers by more than 30 volume %.

11. The in-mold cured product of claim 8 containing said reinforcing fibers by more than 30 volume %.

12. The in-mold cured product of claim 9 containing said reinforcing fibers by more than 30 volume %.

13. The in-mold cured product of claim 7 produced by pultrusion.

14. The in-mold cured product of claim 8 produced by pultrusion.

15. The in-mold cured product of claim 9 produced by pultrusion.

16. The in-mold cured product of claim 10 produced by pultrusion.

17. The in-mold cured product of claim 11 produced by pultrusion.

18. The in-mold cured product of claim 12 produced by pultrusion.

* * * * *